United States Patent
Haynes et al.

[11] Patent Number: 5,913,329
[45] Date of Patent: Jun. 22, 1999

[54] HIGH TEMPERATURE, HIGH SPEED ROTARY VALVE

[75] Inventors: Bryan David Haynes, Alpharetta; Lamar Heath Gipson, Acworth; Jeffrey Lawrence McManus, Woodstock; Kenneth Randall Suggs, Cumming; Jark Chong Lau, Roswell; Paul Allan Giles, Marietta, all of Ga.

[73] Assignee: Kimberly-Clark Worldwide, Inc., Neenah, Wis.

[21] Appl. No.: 08/820,182

[22] Filed: Mar. 19, 1997

Related U.S. Application Data

[63] Continuation of application No. 08/572,985, Dec. 15, 1995, abandoned.

[51] Int. Cl.$^6$ .......................... F16K 49/00; F16K 11/06
[52] U.S. Cl. .......................... 137/338; 137/624.13
[58] Field of Search .................. 137/1, 624.13, 137/338

[56] References Cited

U.S. PATENT DOCUMENTS

| | | | |
|---|---|---|---|
| 1,856,401 | 5/1932 | Prince . | |
| 2,065,124 | 12/1936 | Dreyfus et al. | 18/8 |
| 2,398,542 | 4/1946 | Light | 137/624.13 X |
| 2,477,590 | 8/1949 | Ferwerda et al. | 251/84 |
| 2,574,221 | 11/1951 | Modigliani | 154/90 |
| 2,954,271 | 9/1960 | Cenzato | 18/54 |
| 2,980,138 | 4/1961 | Detweiler et al. | 137/624.13 |
| 2,982,310 | 5/1961 | West | 137/793 |
| 3,061,401 | 10/1962 | Studer et al. | 18/54 |
| 3,110,059 | 11/1963 | Tallis et al. | 18/8 |
| 3,111,140 | 11/1963 | Fjermestad | 137/624.13 |
| 3,124,162 | 3/1964 | Cameron | 137/625.11 |
| 3,207,587 | 9/1965 | Fulk | 65/5 |
| 3,214,149 | 10/1965 | Budzien | 261/29 |
| 3,282,668 | 11/1966 | Mabru | 65/12 |
| 3,338,992 | 8/1967 | Kinney | 264/24 |
| 3,341,394 | 9/1967 | Kinney | 161/72 |
| 3,422,848 | 1/1969 | Liebman et al. | 137/625.15 |
| 3,436,792 | 4/1969 | Hench | 18/8 |
| 3,438,104 | 4/1969 | Stoller | 28/72 |
| 3,442,633 | 5/1969 | Perry | 65/3 |
| 3,444,587 | 5/1969 | Polovets et al. | 18/8 |

(List continued on next page.)

FOREIGN PATENT DOCUMENTS

| | | |
|---|---|---|
| 0 512 763 | 11/1992 | European Pat. Off. . |
| 0 625 659 | 11/1994 | European Pat. Off. . |
| 2 217 459 | 10/1974 | France . |
| 296872 | 8/1915 | Germany . |
| 11 11 334 | 7/1961 | Germany . |
| 2 302 928 | 7/1974 | Germany . |
| 28 18 582 | 11/1978 | Germany . |
| 4 014 989 | 11/1991 | Germany . |
| 47-90 | 11/1969 | Japan . |
| 46-34373 | 10/1971 | Japan . |
| 47-9527 | 3/1972 | Japan . |
| 47-32136 | 8/1972 | Japan . |
| 48-38025 | 11/1973 | Japan . |
| 52-5631 | 2/1977 | Japan . |
| 5-195309 | 1/1992 | Japan . |
| 0 533 304 | 2/1941 | United Kingdom . |
| 0 749 779 | 5/1956 | United Kingdom . |
| 1 157 695 | 7/1969 | United Kingdom . |
| 86/04936 | 8/1986 | WIPO . |

*Primary Examiner*—Gerald A. Michalsky
*Attorney, Agent, or Firm*—James B. Robinson

[57] ABSTRACT

There is provided a high speed rotary valve which is relatively simple in design and which can effectively regulate the flow of fluid under high temperature conditions in such a manner as to produce perturbations in the fluid stream. Such a valve may be used to regulate the flow of fluid, e.g. air, toward a work piece to produce a perturbation in the piece for example. The clearance between the rotor and stator is such that the flow of fluid is never completely cut off, i.e., the valve continues to "leak through" the closed outlet port even when the rotor and stator openings are not aligned. Fluids having temperatures in the range of 40 to at least 900° F. may be processed through this valve. The valve is also useful in creating aerosols of liquids and gases and in producing blown fibers.

7 Claims, 4 Drawing Sheets

U.S. PATENT DOCUMENTS

| | | | |
|---|---|---|---|
| 3,502,763 | 3/1970 | Hartmann | 264/210 |
| 3,509,009 | 4/1970 | Hartmann | 161/150 |
| 3,542,615 | 11/1970 | Dobo et al. | 156/181 |
| 3,568,716 | 3/1971 | Heitzman | 137/624.14 |
| 3,616,037 | 10/1971 | Burger | 156/303 |
| 3,663,206 | 5/1972 | Lubanska | 75/60 |
| 3,682,734 | 8/1972 | Burger | 156/166 |
| 3,692,618 | 9/1972 | Dorschner et al. | 161/72 |
| 3,802,817 | 4/1974 | Matsuki et al. | 425/66 |
| 3,806,289 | 4/1974 | Schwartz | 425/72 |
| 3,825,379 | 7/1974 | Lohkamp et al. | 425/72 |
| 3,825,380 | 7/1974 | Harding et al. | 425/72 |
| 3,849,241 | 11/1974 | Butin et al. | 161/169 |
| 3,912,478 | 10/1975 | Presby | 65/2 |
| 3,924,805 | 12/1975 | Nebeker et al. | 239/381 X |
| 3,937,252 | 2/1976 | Ishida | 137/624.13 |
| 3,967,118 | 6/1976 | Sternberg | 250/325 |
| 3,967,362 | 7/1976 | Bradt | 425/72 |
| 3,999,909 | 12/1976 | Schippers | 425/72 |
| 4,003,774 | 1/1977 | Lebet et al. | 156/180 |
| 4,015,963 | 4/1977 | Levecque et al. | 65/5 |
| 4,058,960 | 11/1977 | Movshovich et al. | 57/34 |
| 4,070,218 | 1/1978 | Weber | 156/167 |
| 4,100,324 | 7/1978 | Anderson et al. | 428/288 |
| 4,102,662 | 7/1978 | Levecque et al. | 65/5 |
| 4,113,456 | 9/1978 | Levecque et al. | 65/5 |
| 4,118,213 | 10/1978 | Levecque et al. | 65/5 |
| 4,123,243 | 10/1978 | Levecque et al. | 65/16 |
| 4,139,059 | 2/1979 | Levecque et al. | 65/5 |
| 4,146,378 | 3/1979 | Levecque et al. | 65/5 |
| 4,159,199 | 6/1979 | Levecque et al. | 65/5 |
| 4,185,981 | 1/1980 | Ohsato et al. | 65/5 |
| 4,211,737 | 7/1980 | Di Drusco et al. | 264/12 |
| 4,316,731 | 2/1982 | Lin et al. | 65/5 |
| 4,340,563 | 7/1982 | Appel et al. | 264/518 |
| 4,360,040 | 11/1982 | Cove et al. | 137/625.3 |
| 4,374,888 | 2/1983 | Bornslaeger | 428/198 |
| 4,444,961 | 4/1984 | Timm | 526/88 |
| 4,472,329 | 9/1984 | Muschelknautz et al. | 264/12 |
| 4,478,248 | 10/1984 | DeVall et al. | 137/624.13 |
| 4,622,259 | 11/1986 | McAmish et al. | 428/171 |
| 4,623,706 | 11/1986 | Timm et al. | 526/88 |
| 4,643,216 | 2/1987 | Philpot et al. | 137/15 |
| 4,666,673 | 5/1987 | Timm | 422/135 |
| 4,692,106 | 9/1987 | Grabowski et al. | 425/66 |
| 4,787,417 | 11/1988 | Windsor, Jr. | 137/624.13 |
| 4,802,508 | 2/1989 | Styles et al. | 137/624.13 |
| 4,818,463 | 4/1989 | Buehning | 264/40.1 |
| 4,818,464 | 4/1989 | Lau | 264/510 |
| 4,818,466 | 4/1989 | Mente et al. | 264/555 |
| 4,820,142 | 4/1989 | Balk | 425/66 |
| 4,847,035 | 7/1989 | Mente et al. | 264/555 |
| 4,881,574 | 11/1989 | Olson et al. | 137/624.13 |
| 4,986,307 | 1/1991 | Hardee | 137/624.13 X |
| 4,992,124 | 2/1991 | Kurihara et al. | 156/161 |
| 5,014,748 | 5/1991 | Nogami et al. | 137/625.65 |
| 5,075,068 | 12/1991 | Milligan et al. | 264/555 |
| 5,080,569 | 1/1992 | Gubernick et al. | 425/7 |
| 5,087,186 | 2/1992 | Buehning | 425/72.2 |
| 5,098,636 | 3/1992 | Balk | 264/555 |
| 5,143,121 | 9/1992 | Steinhardt et al. | 137/624.13 |
| 5,148,946 | 9/1992 | Mizuta et al. | 222/1 |
| 5,164,198 | 11/1992 | Bauckhage et al. | 425/6 |
| 5,196,207 | 3/1993 | Koenig | 425/72.2 |
| 5,242,150 | 9/1993 | Shiffler et al. | 251/209 |
| 5,244,607 | 9/1993 | Rheutan, Jr. et al. | 264/23 |
| 5,244,723 | 9/1993 | Anderson et al. | 428/283 |
| 5,248,247 | 9/1993 | Rubhausen et al. | 425/66 |
| 5,248,455 | 9/1993 | Joseph et al. | 264/6 |
| 5,262,110 | 11/1993 | Spaller, Jr. et al. | 264/207 |
| 5,312,500 | 5/1994 | Kurihara et al. | 156/62.4 |
| 5,316,042 | 5/1994 | Lim et al. | 137/625.11 |
| 5,353,838 | 10/1994 | Grant | 137/624.13 |
| 5,405,559 | 4/1995 | Shambaugh | 364/6 | ns to "leak through" the closed outlet port even when
HIGH TEMPERATURE, HIGH SPEED ROTARY VALVE This application is a continuation of application Ser. No. 08/572,985 entitled "HIGH TEMPERATURE, HIGH SPEED ROTARY VALVE" and filed in the U.S. Patent and Trademark Office on Dec. 15, 1995 now abandoned. The entirety of this application is hereby incorporated by reference.

BACKGROUND OF THE INVENTION

Rotary valves are used in industry for a number of applications like controlling the flow of liquids to molds and reactors, regulating the flow of hydraulic fluids to control various machine functions, and controlling fluids which impinge upon work pieces. The majority of these applications take place at relatively low rotational speed and/or in a stepwise manner, relatively low temperature and pressure, and a number of suitable control means have been developed.

Suitable means for prior fluid regulation valve applications have been gate valves, ball valves, etc., rotating shafts with oddly shaped voids, through the use of electronic means such as solenoids, and by using disks having holes to redirect the flow stream. One example of a valve is that of U.S. Pat. No. 5,014,748 to Nogami et al. which shows a valve which directs the fluid through a number of irregular voids in discs and in stationary parts which align and unalign in specific ways to direct and redirect the fluid to the exit. Another such valve is that of U.S. Pat. No. 3,124,162 to Cameron which uses a solenoid. U.S. Pat. No. 4,802,508 to Styles et al. redirects fluid flow to multiple ports. Other complex valving systems exist, e. g. as shown in U.S. Pat. No. 3,422,848.

Such methods are effective for some applications which generally take place at lower speeds and temperature but are not fully satisfactory for high temperature and high speed applications. The regulation of fluid flow with solenoids, for example, relies on something which undergoes a reciprocating motion and so is subject to significant jarring action and as such is prone to failure. Solenoids have the further drawback of requiring an electrical input for operation as well as for signaling when to open and close and of having an upper frequency limit of about 50 Hz. Because solenoids move in a reciprocating fashion, they also have a further limitation which is the amount of fluid which they can process, since regulating a large flow would require a large solenoid and the mass of the valve itself becomes prohibitively large for rapid reversal of direction.

Other methods of regulating flow force the fluid to travel through various tortuous paths, repeatedly changing direction, prior to exiting the device. Such a method of turning and returning the flow stream results in time delays in the output stream and can be quite mechanically complicated.

There remains, therefore, a need for a means of controlling the flow of a fluid for high speed changes, e.g. fluid pulses or perturbations, which is relatively simple in design and suited for high temperature applications. Such a valve may be used in applications such as creating aerosols of liquids and gases (e.g. carburation of fuels, pesticide application, paint spraying) and in nonwoven fiber production. It is therefore an object of this invention to provide a high speed valve which creates perturbations in a fluid flow stream.

SUMMARY OF THE INVENTION

There is herein provided a rotary valve which is relatively simple in design and which effectively regulates the flow of fluid under high temperature conditions in such a manner as to produce perturbations within the flow. Such a valve may be used to regulate the flow of fluid, e.g. air, toward a work piece to produce a perturbation in the piece for example. The clearance between the rotor and stator may be adjusted such that a varying amount of air is allowed to "leak through" and the flow of fluid is never completely cut off, i.e., the valve continues to "leak through" the closed outlet port even when the rotor and stator openings are not aligned.

In its broadest embodiment, the rotary valve is comprised of a rotor having at least one opening, and a shaft at the rotor's center axis which is rotated by a motor; a stator arranged adjacent to the rotor and having at least one fluid port communicating sequentially with the rotor opening as the rotor turns adjacent to the stator about the shaft, and a housing having at least one port wherein the housing encloses the rotor; wherein the valve can introduce a perturbation into a non-discontinuous fluid stream.

The valve may be used in low temperature applications and high temperature applications and may be used for gasses like air or steam or for liquids like water.

DEFINITIONS

Figure 1:
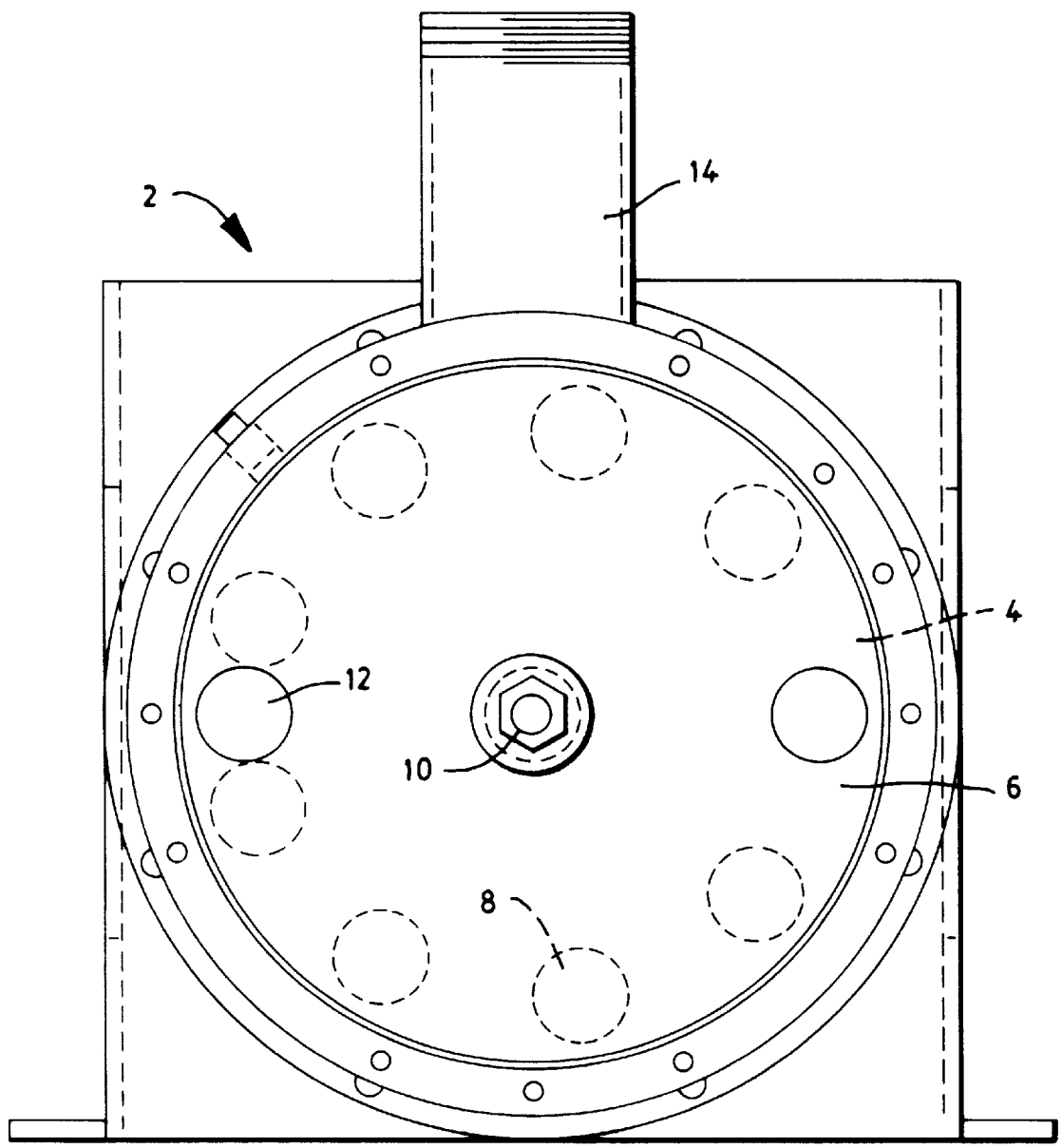
FIG. 1 is an end view of a rotor with openings which is suitable for this invention along with a stator portion wherein the flow is axial.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 30 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, are generally smaller than 10 microns in average diameter, and are generally tacky when deposited onto a collecting surface.

As used herein, the term "coform" means a process in which at least one meltblown diehead is arranged such that a chute through which other materials are added to the web while it is forming is present. Such other materials may be pulp, superabsorbent particles, cellulose or staple fibers, for example. Coform processes are shown in commonly assigned U.S. Pat. No. 4,818,464 to Lau and U.S. Pat. No. 4,100,324 to Anderson et al. Webs produced by the coform process are generally referred to as coform materials or coform webs.

As used herein, the term "perturbation" means a small to moderate change from the steady flow of fluid, for example up to 50 percent of the steady flow, and not having a discontinuous flow at any time. Repetitive perturbations are generally specified by two characteristics, frequency and amplitude. The repetitive perturbation frequency may be defined as the number of flow irregularities, e.g., pulses or oscillations, provided per unit time to an outlet. As is commonly the case, frequency will be described in Hertz; the number of cycles per second throughout the specification. The perturbation amplitude may be described by the percentage increase in the stream pressure by comparing the maximum and minimum perturbed stream pressure (delta P) to the steady state pressure (Ps) or as (delta P)/Ps×100. The perturbation amplitude may also be described as peak to peak increase to decrease in a graph of the air flow rate during perturbation as compared to the steady state. Thus the primary variables which are controlled by the valve of this invention are perturbation frequency and amplitude.

As used herein, the term "fluid" shall mean any liquid or gaseous medium, however in general the preferred fluid is a gas and more particularly air. The preferred liquid is water. The term fluid is also meant to encompass steam, both saturated and superheated.

DETAILED DESCRIPTION OF THE INVENTION

Traditional valves for the direction of fluids have existed for almost as long as the wheel and have been designed to stop or redirect the flow of fluids. The standard water valve in a process piping system takes a position from fully open to fully closed, or in between for example producing steady flow at that position. Examples of such valves are gate, ball, globe, plug and butterfly valves as shown in the *Chemical Engineers' Handbook* by Perry and Chilton, ISBN 007-049478-9, pages 6-54 to 6-57. Specialty valves have been developed such that the flow of fluid through the valve is never stopped but is diverted in turn to various destinations, like, for example the three-way cock valve shown in *Flow of Fluids Through Valves, Fittings and Pipe* by the Crane Co., technical paper 410, page A-29. Means of controlling such on/off or specialty valves have also been developed in order to produce desired on/off frequencies or patterns. For example, U.S. Pat. No. 3,912,478 shows methods of regulating an on/off flow of gas towards a fiber as it is being drawn including using an apertured plate, a tubing pump or an electromechanical valve. Other methods have been cited above. The common feature of these known valves is that they are designed to direct all of the flow to one (or more) outlets while cutting off flow to others. In fact, conventional valves are considered to have failed if they allow fluid to "leak through" the valve to an undesired destination. Note that a valve that "leaks through" is to be distinguished from a valve that "leaks out", i.e., one which allows fluid to escape outside the valve body and piping.

The valve of this invention is designed with adjustable and relatively loose tolerances between the rotor and stator specifically to provide a valve which, contrary to the teachings of conventional valve technology, can allow a volume of fluid to leak through. In the normal operation of this valve, in fact, the variation in pressure between the open and closed ports of the valve will be under 50 percent and more particularly under 20 percent and still more particularly less than 10 percent. This valve is not used, therefore, to completely stop flow, or make the flow discontinuous, but merely to introduce pressure pulses or perturbations into the fluid stream. This lack of flow discontinuity is in contrast with Shambaugh (U.S. Pat. No. 5,405,559), for example, which requires discontinuous flow.

One advantage of this approach to valve design is that the valve of this invention may be used at relatively high temperatures, and over relatively large temperature variations, without binding. Fluids with temperatures of about 600° F. (316° C.) have been successfully processed using this valve though there is no upper limit to the temperature of the fluid stream except that dictated by the limitations of the materials of construction of the valve. Temperatures of up to about 900° F. (482° C.) are contemplated by the inventors. Further, wide tolerances for the valve parts makes manufacturing costs quite low compared to conventional narrow tolerance valves. During the processing of high temperature fluids, a heat slinger or fin cooler may be used on the drive shaft of the valve to protect the bearings, motor and other parts from overheating. Such heat dissipaters are known in the art and any alternative method known to be effective may also be used.

Turning now to the figures, FIG. 1 shows the cutaway end view of valve 2 showing a rotor 4 behind a stator 6. Rotor 4 has nine equally spaced, equally sized openings 8 shown in dashed lines and arranged at an equal distance from its center axis shaft 10. There may be any number of openings 8 in the valve of this invention, the number being dependent upon the frequency of perturbation desired in conjunction with the shaft 10 speed. Though the embodiment shown in FIG. 1 has nine openings 8, there could be as few as one or as many as can be machined into a rotor. Further, it is also possible that the openings in the rotor vary in spacing and not be equal in size, though this would present a practical problem in manufacturing the rotor as a part rotating at high speed must, of course, be balanced. Likewise, there may be more than the shown two outlet ports 12. In this case, however, the stator 6 has two outlet ports 12 which alternately communicate with a rotor opening 8. Inlet port 14 is visible in this view and may be threaded or welded to process piping which supplies the perturbing and/or perturbed fluid. The exact dimensions of the openings 8 are determined by the size of the valve 2, and the time desired between pulses. The stator 6 is part of an overall housing 16 which encloses the rotor 4.

Figure 2:
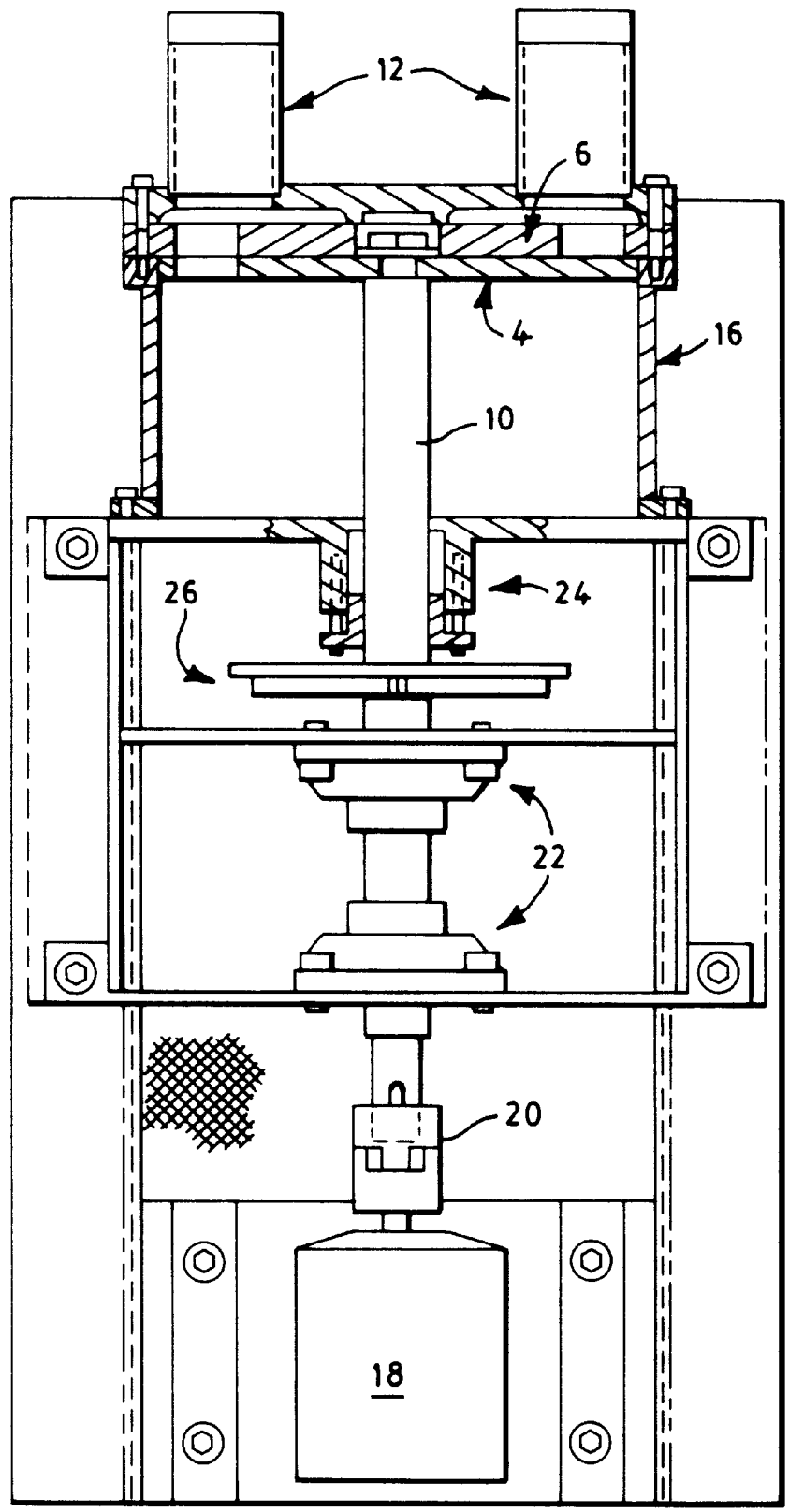
FIG. 2 is a side view of the valve of FIG. 1 showing the rotor, stator and housing.

FIG. 2 is a plan view perpendicular to FIG. 1 and shows the motor 18 connected to the shaft 10 via standard coupling 20, bearing 22, and packing ring 24 means. Also shown in FIG. 2 is heat slinger 26 which serves to reduce the temperature transmitted from the area of the rotor 4 to the bearings 22 during high temperature fluid processing, as a means of protecting the bearings 22 from the heat and prolonging their life. A temperature differential of as much as 460° F. (256° C.) has been observed between the bearings 22 and the fluid using fluid at 600° F. The outlet ports 12 are visible in this view as are the stator 6, rotor 4 and housing 16. The outlet ports 12 may be threaded to connect to standard piping or may be welded to piping and FIG. 2 shows the threaded ends of the outlet ports 12. FIG. 2 makes clear that flow through the rotor 4 and stator 6 in this embodiment is axial.

Figure 3:
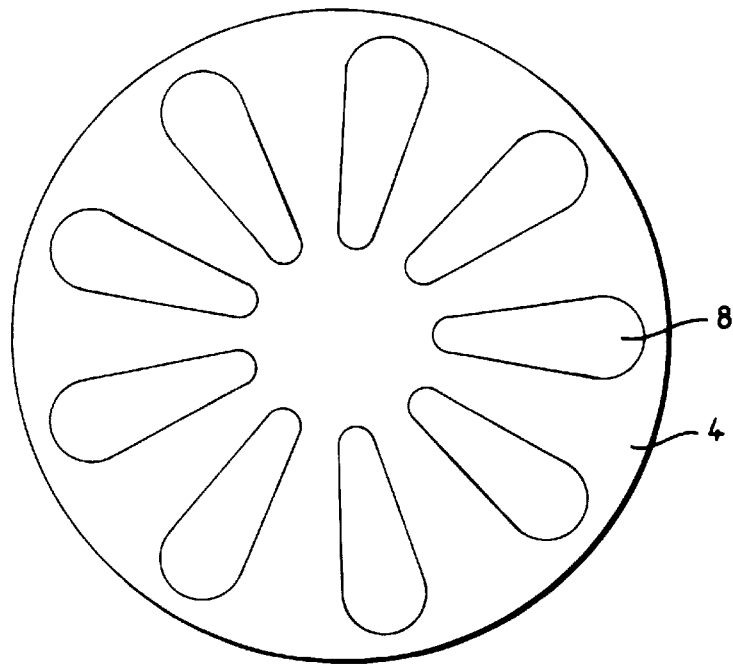
FIG. 3 shows a configuration of the openings on a rotor in which the openings are tear-drop shaped.

FIG. 3 shows yet another configuration of the openings 8 on a rotor 4 in which the openings 8 are tear-drop shaped.

The clearance between the rotor and stator must be enough to maintain a difference in the pressure between the outlet ports but not make it discontinuous. More particularly, the pressure variation is usually less than 20 percent. In the case of heated air at about 600° F., for example, it has been found that a clearance of between about 25 and 75 thousands of an inch (0.6 and 1.9 mm) is optimal at a flow rate of between 1000 and 2500 standard cubic feet per minute (SCFM) for a rotor having a diameter of 14.75 inches (375 mm). More particularly, for air at about 600° F. and about 460 SCFM (13026 LPM) the preferred gap is about 50 thousands of an inch (1.27 mm). Such a gap can produce a pulse or perturbation at a magnitude of up to almost 10 percent at a frequency of up to about 1000 hertz. Higher frequencies are possible and depend, for example, on the size of the motor being used to drive the valve, everything else being constant.

One embodiment of the invention is shown in FIG. 1 and has nine circular openings in the rotor and stator. The openings have a diameter of 2.068 inches (52.5 mm) and the rotor has a diameter of 14.75 inches. The clearance between the stator and the rotor is about 50 thousands of an inch (1.27 mm). The motor used to turn the shaft may typically be between 1 and 10 horsepower, or more particularly about 5 HP.

Figure 4:
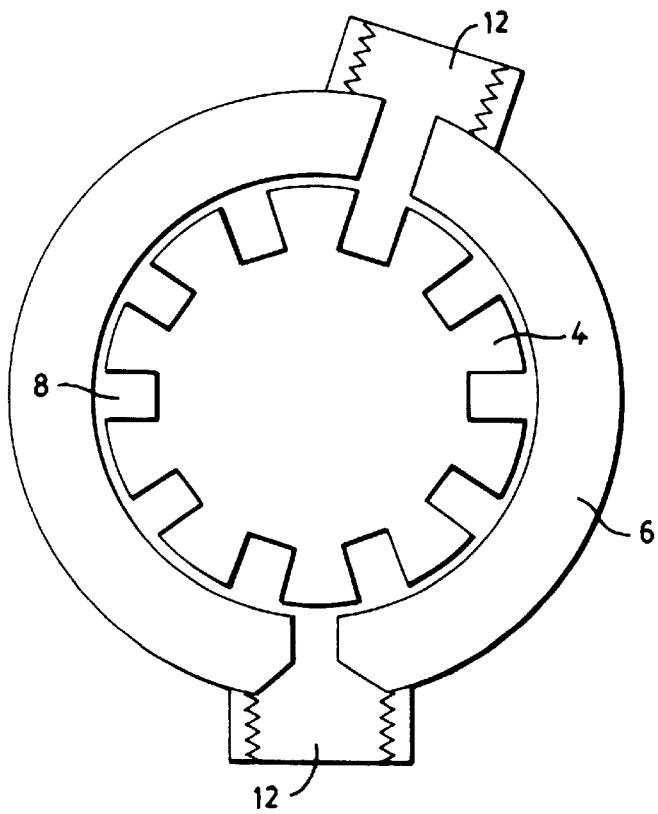
FIG. 4 is an end view of a rotor with peripheral notches which is suitable for this invention and around which is arranged a stator portion wherein the flow is radial.

The valve of this invention has a rotor with at least one opening which may be an aperture as shown in FIG. 1, or peripheral notch as shown in FIG. 4, and where the rotor rotates adjacent a stator which is part of a housing. In operation, the notch(es) or aperture(s) sequentially communicates with the outlet ports of the stator such that flow increases or decreases as the openings in the rotor and stator align. The openings in the rotor and the stator may be of any configuration, e.g. circles, semi-circles, ovals, tear-drop, squares, etc., depending on the pressure response desired and need not be the same as each other on the same rotor. It should be noted that flow through embodiments of the invention in which there are apertures in the rotor is in an axial direction, while the fluid passing through embodiments having peripheral notches in the rotor must necessarily exit radially as shown in FIG. 4. FIG. 4 shows the notches 8 on the rotor 4 and the outlet ports 12.

Figure 5:
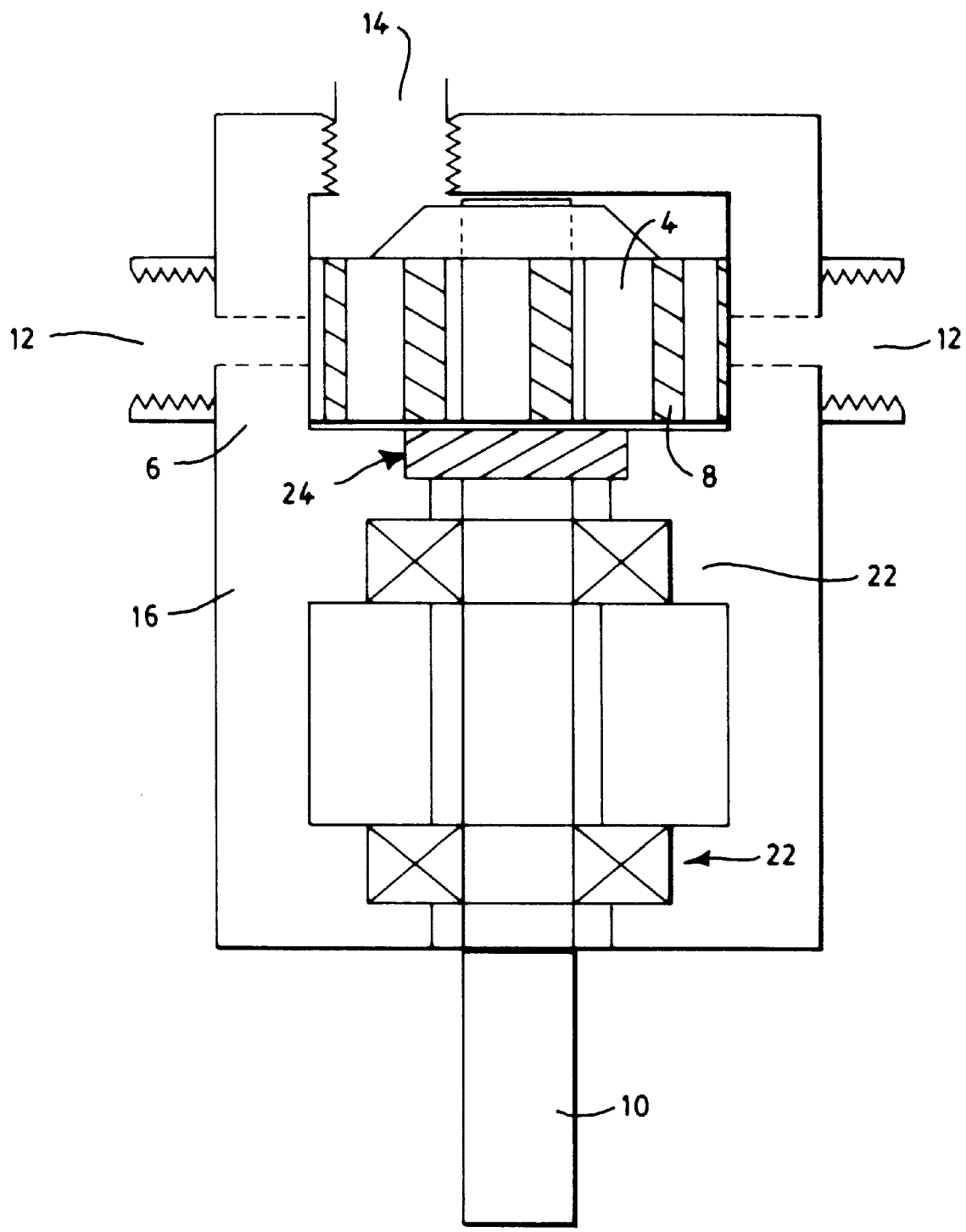
FIG. 5 shows a cross-sectional view of FIG. 4.

FIG. 5 is a plan view perpendicular to FIG. 4 and shows the shaft 10 connected to the rotor 4 and the stator 6 which also serves as part of the housing 16. Also visible are inlet port 14, outlet ports 12, bearings 22, packing ring means 24 and notches 8. FIG. 5 clearly illustrates the axial entry of fluid to the rotor 4 and radial exit of fluid required in an embodiment having peripheral notches.

The valve of this invention is useful in a variety of processes. One such process is that described in U.S. patent application Ser. No. 08/510,353, filed Aug. 2, 1995, now U.S. Pat. No. 5,667,749, with inventors Lau and Haynes and commonly assigned with this application, which is directed toward improved nonwoven fiber formation resulting in improved webs and fabrics. In the Lau and Haynes invention, the valve of this invention may be used to introduce a perturbation in the fluid used to attenuate newly formed microfibers such as spunbond and meltblown materials. The valve may also be used in the coform process. Another such use is in the art of atomizing liquids into a mist or aerosol or entraining a liquid into a gaseous flow stream. Atomizing apparatus are useful in creating fuel/air mixtures for engines and furnaces (carburation), paint spraying, and in any application in which liquid is entrained in a gaseous flow (e.g. pesticide application) and an even distribution of the liquid and narrow particle size distribution in the airflow is desired.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A high speed rotary valve comprising a rotor having plurality of equally spaced, equal size apertures and a shaft at a center axis; a stator arranged adjacent said rotor having a plurality of axial fluid outlet ports which alternately communicate with said apertures as said rotor turns adjacent said stator about said shaft; and wherein said rotor and stator have a clearance gap such that flow through said ports has a perturbation amplitude of less than 20 percent; and wherein said motor and plurality of apertures are adapted to create a pulsed fluid flow having a frequency of at least about 100 Hertz; and a heat removal device and a coupling device wherein said coupling device is attached to said shaft and said motor and further wherein said heat removal device is positioned between said coupling device and said rotor.

2. The high speed rotary valve of claim 1 wherein said fluid is a liquid and said liquid is water.

3. The high speed rotary valve of claim 1 wherein said rotor rotates at a speed sufficient to produce a frequency of between about 100 and 1000 Hertz.

4. The high speed rotary valve of claim 1 wherein said fluid is at a temperature between about 400 and °800 F.

5. The high speed rotary valve of claim 4 wherein said fluid is a gas and said gas is air.

6. The high speed rotary valve of claim 5 wherein said valve is adapted to have a throughput of at least about 460 scfm.

7. The high speed rotary valve of claim 4 wherein said fluid is steam.

\* \* \* \* \*